United States Patent [19]

Reinsma

[11] 4,256,316
[45] Mar. 17, 1981

[54] JOINT SEALING STRUCTURE

[75] Inventor: Harold L. Reinsma, Dunlap, Ill.
[73] Assignee: Caterpillar Tractor Co., Peoria, Ill.
[21] Appl. No.: 117,582
[22] PCT Filed: Oct. 15, 1979
[86] PCT No.: PCT/US79/00844
  § 371 Date: Oct. 15, 1979
  § 102(e) Date: Oct. 15, 1979
[51] Int. Cl.³ .................... F16J 15/32; F16J 15/34
[52] U.S. Cl. .................................. 277/92; 277/95;
  277/152; 277/166; 277/186; 305/11
[58] Field of Search .................................. 277/38-41,
  277/84, 92, 95, 152, 153, 166, 179, 186, 189;
  305/11-13

[56] References Cited

U.S. PATENT DOCUMENTS

| | | | |
|---|---|---|---|
| 2,294,105 | 8/1942 | Wallgren | 277/84 X |
| 2,736,585 | 2/1956 | Riesing | 277/153 |
| 2,797,944 | 7/1957 | Riesing | 277/179 |
| 2,938,744 | 5/1960 | Fritch | 277/95 X |
| 3,110,097 | 11/1963 | Yocum | 277/95 X |
| 3,269,738 | 8/1966 | Baumler et al. | 277/81 R |
| 3,370,895 | 2/1968 | Cason | 277/95 X |
| 3,614,113 | 10/1971 | Burk | 305/11 X |

*Primary Examiner*—Robert S. Ward, Jr.

*Attorney, Agent, or Firm*—Wegner, Stellman, McCord, Wiles & Wood

[57] ABSTRACT

A joint sealing structure (19,119,219) for use in sealing relatively axially movable members (11,14) of a joint (10) over a wide range of such axial movement. The sealing structure includes a seal ring (20,120,220) having a seling lip (21,121,221) having a maintained dynamic seal with a sealing surface (22) of one of the joint members. A stiffener (23,123,223) is provided for transferring biasing force from a spring means (29,129,229) to the sealing lip. The stiffener may be provided with a flexible connecting portion (27,127,227) permitting free movement of the sealing lip under the biasing action of the spring means over the range of movement between the joint members. In one form, a base (28) may be provided to which the connecting portion (27) is mounted, the base being fitted into the counterbore 817) of the joint member so as to provide a static seal therebetween. The base may be provided with a turned flange for carrying the outer portion (33) of the spring (30) for free movement of the spring means in maintaining the biasing action. The spring means may comprise Belleville spring means arrangement to pass over center over the range of movement of the joint members so as to provide an effectively constant spring biasing force to the sealing lip.

23 Claims, 5 Drawing Figures

JOINT SEALING STRUCTURE

DESCRIPTION

1. Technical Field

This invention relates to seals and in particular to boot-type face seals having associated spring means for maintaining sealing engagement thereof.

2. Background Art

In U.S. Pat. No. 3,614,113 of Duane L. Burke, which patent is owned by the assignee hereof, a boot-type seal is shown for use in sealing a track pin assembly. The seal includes Belleville spring means for biasing opposed portions of the boot into sealing engagement with confronting surfaces of the members to be sealed. The legs of the boot engaged by the opposed Belleville springs are resilient and a bight portion of the boot provides a static seal with a radially outer surface of one of the members to be sealed.

In U.S. Pat. No. 3,269,738, Herman Baumler et al show a seal for use in rotary piston motors wherein a disc spring is embedded in an elastic body and removably connected with a glide ring. The disc spring may be radially slotted.

In U.S. Pat. No. 3,370,895 of George A. Cason, Jr., a seal is shown for use with drilling bits wherein a spring is provided within a rubber sealing ring. The sealing ring, in turn, is bonded to a resilient holding ring. Other patents of less pertinency, while showing a number of different forms of seals, are those of George E. Dunn U.S. Pat. No. 2,338,169; F. W. Koller U.S. Pat. No. 2,481,430; Bernard F. Kupfert et al U.S. Pat. No. 2,814,513; Fred E. Simpson et al U.S. Pat. No. 3,050,346; Harold L. Reinsma U.S. Pat. No. 3,218,107, which patent is owned by the assignee hereof; Seisakusho British Pat. No. 1,425,364; and Japanese Pat. No. 131,725.

DISCLOSURE OF THE INVENTION

The present invention comprehends an improved joint sealing structure wherein the lip of the sealing ring of the annular seal is urged into sealing engagement with the confronting sealing surface of the joint member by spring means acting through a rigid seal portion.

The rigid portion of the seal is mounted to a flexible portion, in turn mounted in the counterbore of the joint recess receiving the seal to permit the spring means to maintain a dynamic seal between the lip and the joint member sealing surface notwithstanding substantial axial movement between the joint members.

The rigid force-transmitting means is bonded to an outer annular resilient member which is fitted into the counterbore of the recess to support the rigid means radially inwardly thereof. The sealing ring may be connected to the rigid force-transmitting means. In one embodiment, the sealing ring and force-transmitting means are defined by unitary elements.

The spring means may comprise annular Belleville spring means arranged to be deflected past its flat position in the range of movement between the joint members so as to provide an effectively minimized force variation in the sealing force applied by the spring means to the sealing lip.

The spring means may engage the rigid portion of the seal in an annular radially inwardly and axially outwardly opening recess so as to act generally axially of the sealing lip radially inwardly of the radially outer counterbore surface in which the seal structure is received.

The sealing structure of the present invention is extremely simple and economical of construction while yet providing the highly desirable features discussed above.

BEST MODE FOR CARRYING OUT THE INVENTION

Figure 1:
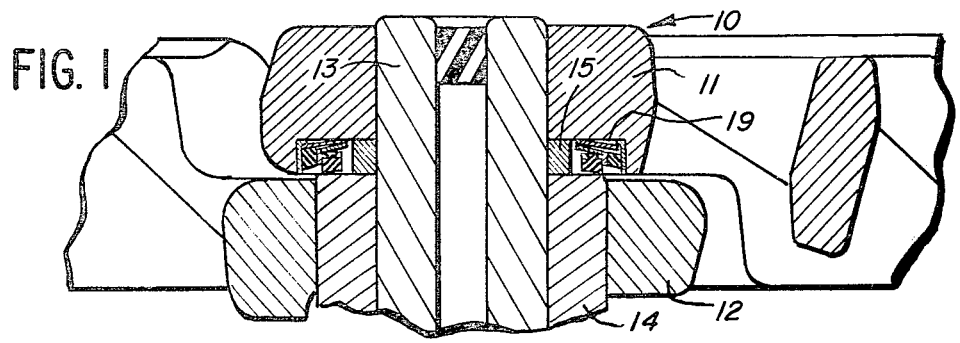
FIG. 1 is a fragmentary section of a joint having a sealing structure embodying the invention.
Figure 2:
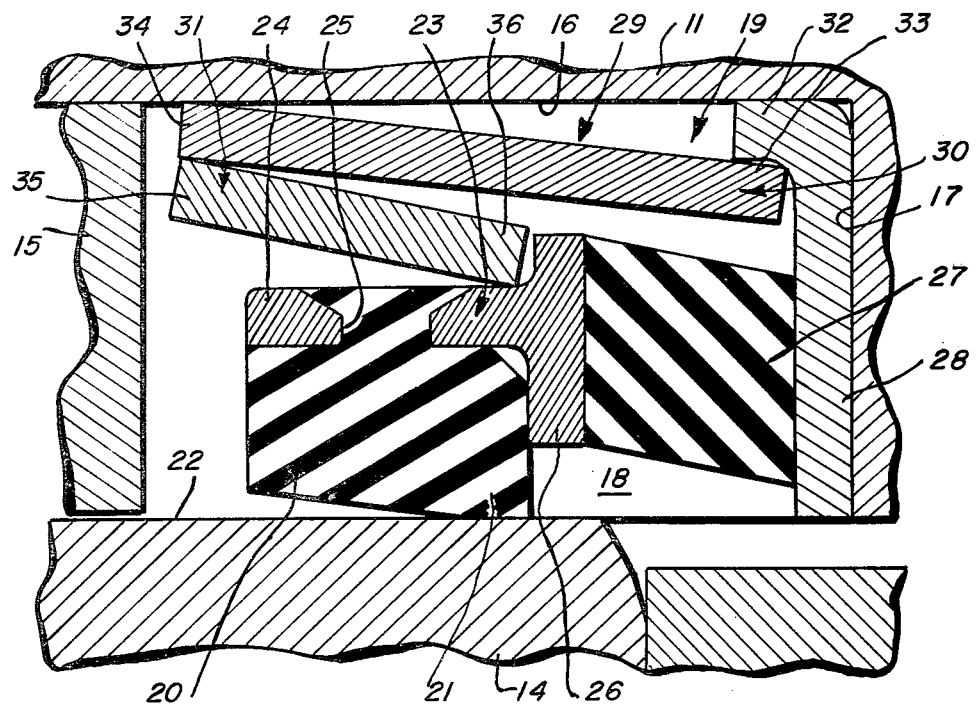
FIG. 2 is a fragmentary enlarged section of the sealing structure.
Figure 3:
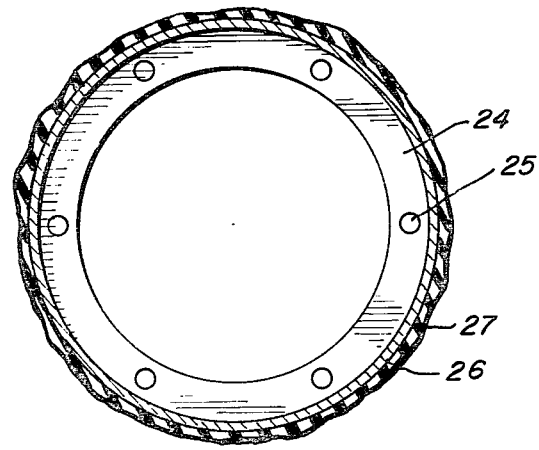
FIG. 3 is a plan view in partial section of the seal stiffener.

In the exemplary embodiment of the invention as shown in FIGS. 1–3 of the drawing, a joint 10 is shown to include a first member, herein a link 11 connected to a link 12 by a pin 13. The illustrated joint comprises a track joint, such as for use in a tractor or the like.

The outer end of the pin is press-fitted in by the link 11 and an inner portion of the pin is rotationally fitted in a second member, herein a bushing 14 in link 12. Axial movement between the bushing 14 and link 11 is limited by a thrust ring 15 which, as shown in FIG. 2, cooperates with the axially outer inwardly facing surface 16 and the radially outer radially inwardly facing surface 17 with a counterbore in link 11 to define a seal space 18. The invention comprehends the provision of an improved sealing structure 19 within seal space 18 for effectively sealing the joint members 11 and 14 to each other notwithstanding a substantial axial movement therebetween.

More specifically, as best seen in FIG. 2, sealing structure 10 includes a seal ring 20 having a lip portion 21 engaging the axially outer sealing surface 22 of the bushing.

The seal ring is carried by an annular stiffener 23 which, as shown in FIG. 2, may have a T-section including a radially extending leg portion 24 having a plurality of openings 25 through which the sealing ring 20 is molded. Seal ring 20 may be formed of any suitable highly abrasion-resistant sealable mold material, one example thereof being polyurethane.

The stiffener 23 may further include a transversely extending head portion 26 which is bonded to a resilient annular connecting portion 27 in turn bonded to a rigid annular base 28 which may be formed of a material, such as metal. Base 28 is fitted into cylindrical surface 17 of recess 18 and, in the illustrated embodiment, is press fitted thereinto so as to provide a static seal therewith.

Sealing structure 19 further includes annular spring means generally designated 29 which, in the illustrated embodiment comprises Belleville spring means including a first axially outer spring 30 and a second axially inner spring 31. Inner spring 31 has a spring rate sufficiently high to force outer spring 30 past its flat deflected position as the spacing between members 11 and 14 increases, thereby providing a substantially constant spring force to the seal lip over the normal working range of the seal. Base portion 28 of the stiffener is provided with a radially inturned flange 32. The radially outer portion 33 of spring 30 bears against the flange 32 to provide a freely movable support for the spring means 29. The radially inner portion 34 of spring 30 engages the radially inner portion 35 of spring 31. The radially outer portion 36 of spring 31 engages the stiffener leg portion 24 axially outwardly of lip 21 of seal ring 20 so as to provide a spring biasing force acting generally axially toward the lip portion through the stiffener and seal ring 20, as shown in FIG. 2.

Stiffener portion 23,24,26 may be formed of a rigid material, such as metal or hard synthetic resin, so as to provide a positive transmission of spring force to the sealing ring 20 and provide an improved dynamic seal of lip 21 with the joint member surface 22.

The Belleville spring means permits substantial axial movement between joint members 14 and 11 and, thus, between surfaces 16 and 22 without substantial change in the sealing action of lip 21 against sealing surface 22. Thus, the flexible connecting portion 27 of the stiffener means assures free movement of the sealing ring 20 under the biasing action of spring means 29 over a substantial range of axial displacement of surface 22 relative to surface 16 while effectively maintaining the lip 21 stabilized at the confronting portion of sealing surface 22.

To further effectively stabilize the action of the sealing structure 19, the Belleville spring is arranged to deflect past its flat position within the range of movement of the joint members so that the variation in spring force is effectively minimized.

Referring to FIG. 3, stiffener leg portion 24 may be provided with six openings 25 equiangularly spaced about the axis of the annular stiffener for improved distributed securing of the seal ring thereto.

Figure 4:
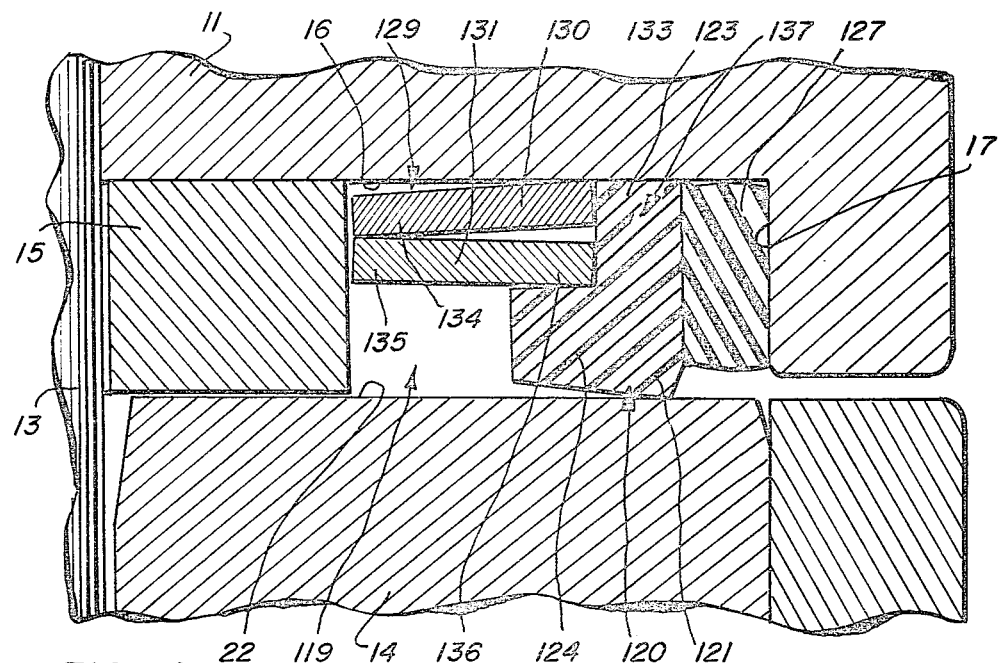
FIG. 4 is a fragmentary section illustrating a modified form of joint embodying the invention.

Referring now to the embodiment of FIG. 4, a modified form of sealing structure generally designated 119 is shown to comprise a structure generally similar to that of sealing structure 19 but wherein the sealing ring and stiffener inner portion define a unitary element 137. The spring means generally designated 129 comprises a pair of Belleville springs 130 and 131 loaded in series. The springs are arranged to accomodate the axial seal travel over a relatively flat portion of the total series spring rate curve without passing the flat position. The radially outer portion 133 of spring 131 engages the joint member surface 16 and the radially outer portion 136 of the spring 131 engages a radially inner portion 124 of the element 137. Element 137 further defines a sealing lip portion 121 sealingly engaging the joint sealing surface 22 and is maintained in dynamic sealing engagement therewith by the spring means 129 acting through the element 137.

A resilient connecting portion 127 is bonded to the element 137 and is compressed within the counter-bore surface 17 to provide a static seal therewith.

Thus, the sealing structure 119 provides an improved dynamic seal of lip 121 with the joint sealing surface 22 over a wide range of movement between the joint members 14 and 11 as in the embodiment of FIGS. 1-3 as a result of the maintained sealing force provided by spring means 129 through the stiffener and sealing element 137 to the lip portion 121 thereof with such movement being freely permitted by the flexible connecting portion 127 of the sealing structure.

In the illustrated embodiment, the element 137 is formed of an abrasion-resistant, relatively hard, high modulus, sealable synthetic resin, such as hard polyurethane. As will be obvious to those skilled in the art, other suitable materials may be utilized for the stiffener and sealing element.

Figure 5:
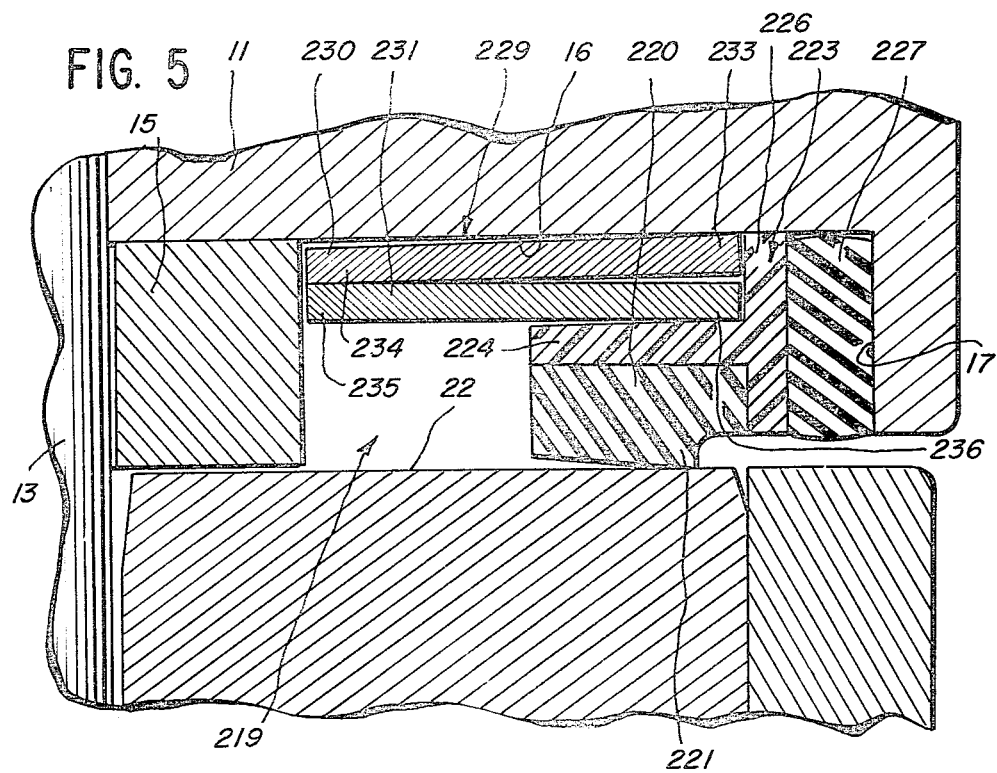
FIG. 5 is a fragmentary section illustrating still another modified form of sealing structure embodying the invention.

A further modified form of sealing structure generally designated 219 is illustrated in FIG. 5.

Sealing structure 219 is generally similar to sealing structure 19 but utilizes a T-shaped stiffener element 223 having the seal ring 220 bonded thereto so as to dispose the sealing lip 221 in sealing engagement with the joint member surface 22. The head portion 226 of the stiffener is bonded to a connecting portion 227 which, in turn, is received in the counterbore 17 of the link 11 so as to have a static seal therewith.

Spring means 229 may be provided in the form of a pair of annular Belleville springs 230 and 231 loaded in series and functioning in the manner previously described relative to spring means 129. The radially outer portion 233 of spring 230 engages the joint member surface 16 and the radially outer portion 236 of the spring 231 engages the leg portion 224 of the stiffener 223 generally axially outwardly of the sealing lip 221 so as to provide a maintained biasing of the sealing lip against the sealing surface 22 at all times notwithstanding a substantial axial movement between the joint member surfaces 22 and 16.

Movement of the sealing lip 221 to follow movement of the surface 22 is readily permitted by the flexible connecting portion 227 under the biasing action of the spring means. The stiffener may be formed of any suitable material, such as metal or relatively hard synthetic resin, so as to provide a positive transmission of the biasing force to the sealing lip, as discussed above.

Thus, each of the embodiments of the invention as discussed above provides an improved maintained sealing of the seal ring lip with the confronting joint sealing surface over a wide range of axial movement of that surface relative to the opposed joint member. The invention comprehends providing an improved stiffener for transmitting a substantially constant spring biasing force to the sealing lip and further contemplates providing a connecting portion of the seal which permits such constant spring force to be applied to the sealing lip over a wide range of movement between the joint members.

Similar elements of each of the different embodiments are identified by similar reference numerals but 100 different.

INDUSTRIAL APPLICABILITY

The sealing structure of the present invention may be utilized in a wide range of different industrial applications. In the illustrated embodiment, the sealing structure is utilized in a track joint wherein the track links are movably connected by a pin and wherein maintained lubrication is a desideratum. As will be obvious to those skilled in the art, the improved sealing structure is advantageously employed wherever an annular seal is utilized in sealing joint members having substantial relative axial movement therebetween and in an abrasive external environment.

The improved novel sealing structure of the present invention provides a number of highly desirable features in such track joint applications. More specifically, the provision of the connecting portion of the seal as a separate element permits it to be formed of a material having optimum resilience characteristics over a wide temperature range as this portion of the seal does not perform the sealing function. Reversely, as the seal ring portion of the sealing structure is divorced from any requirement for flexibly supporting the structure, it may be formed of a material having optimum and uncompromised wear and abrasion-resistance so as to define an optimum sealing element.

Still further, as the sealing structure may be formed by swaging the base element radially inwardly, the connecting portion of the sealing structure may be placed in radial compression to reduce fatigue in the operation of the sealing structure.

The sealing structure may comprise a permanently encapsulated assembly which is effectively tamperproof as it effectively prevents unauthorized disassembly without destroying the base element configuration.

Further, the base element flange provides an improved hard wear bearing portion for the Belleville springs so as to permit controlled supported deflection of the springs in the operation of the sealing structure.

The Belleville springs may have different springs rates so as to provide improved loading characteristics in the sealing structure. Thus, the inner spring engaging the stiffener, or seal, may have a relatively high spring rate with the outer spring having a relatively lower spring rate to permit facilitated deflection past the flat position thereof in achieving the desired relatively constant load characteristic of the sealing structure.

As indicated above, the invention comprehends that the springs may be utilized alternatively to move past the flat position or reach the flat position in the maximum travel position thereof in the operation of the sealing structure. In either mode of utilization, the springs provide an improved flat load characteristic.

In the forms of the invention wherein the rigid base member is not utilized, the resilient connection portion may be compressed within the joint bore in direct facial contact with the joint so as to provide an improved modified form of sealing structure as discussed above.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a joint (10) having a first member (11) defining a cylindrical axially outwardly opening recess (18), a second member (14) adjacent said first member and defining a sealing surface (22) confronting said recess, said members being associated to have relative rotational movement about the axis of the recess and relative movement toward and from each other in the direction of said axis, an improved sealing structure (19,119,219) in said recess for movably sealing said members, comprising:
an annular support member having a radially outer connecting portion (27,127,227) received coaxially in said recess formed of a resilient material having high resiliency over a wide temperature range, and a radially inner rigid stiffener portion (23,123,223);
an annular seal (20,120,220) formed of resilient sealing material having high wear and abrasion resistance, said seal having an axially inner portion carried by said stiffener portion, and an axially outer portion defining a sealing lip (21,121,221) sealingly engaging said confronting sealing surface (22); and
spring means (29,129,229) extending between said first member (11) at the axially outer end (16) of the recess (18) and said stiffener portion (23,123,223) of the support member to urge said lip into maintained movable sealed engagement with said cooperating surface notwithstanding relative axial movement between said members.

2. The joint sealing structure of claim 1 wherein said spring means (29,129,229) comprises Belleville spring means movable to its flat position in the range of relative movement between said members.

3. The joint structure of claim 1 wherein said spring means (129,229) comprises an axially outer Belleville spring (130,230) engaging said first member (11) and an axially inner Belleville spring (131,231) engaging said stiffener portion (123,223), said Belleville springs contacting each other at the radially inner portion (134,135) thereof and diverging from each other radially outwardly.

4. The joint sealing structure of claim 1 wherein said spring means (29) comprises an axially outer Belleville spring (39) engaging said first member (11) and an axially inner Belleville spring (31) engaging said stiffener portion (23), said axially inner spring (31) having an outer diameter substantially less than that of said axially outer spring (30).

5. The joint sealing structure of claim 1 wherein said spring means (23,129,229) comprises an axially outer Belleville spring (30,130,230) engaging said first member (11) and an axially inner Belleville spring (31,131,231) engaging said stiffener portion (23,123,223), said outer spring having a lower spring rate than said inner spring.

6. The joint sealing structure of claim 1 wherein said spring means (29) comprises an axially outer Belleville spring (30) engaging said first member (11) and an axially inner Belleville spring (31) engaging said stiffener portion (23), said axially inner spring (31) having an outer diameter substantially less than that of said axially outer spring (30) and engaging said axially outer spring (30) at a radially inner portion (134,234) thereof.

7. The joint sealing structure of claim 1 wherein said stiffener portion (23) defines a plurality of through openings (25), said seal (20) extending through said openings.

8. The joint sealing structure of claim 1 wherein said spring means (29) comprises Belleville spring means movable past its flat position in the range of movement between said members.

9. The joint sealing structure of claim 1 wherein said support member (23,223) has a T-shaped cross section defining a radially inner leg portion (24,224) and a radially outer transverse portion (26,226), said seal (20,220) being secured to said leg portion and projecting axially inwardly therefrom beyond the inner end of the transverse portion.

10. The joint sealing structure of claim 1 wherein said support member (23,223) has a T-shaped cross section defining a radially inner leg portion (24,224) and a radially outer transverse portion (26,226), said seal (20,220) being adhesively bonded to said leg portion and projecting axially inwardly therefrom beyond the inner end of the transverse portion.

11. In a joint (10) having a first member (11) defining a cylindrical axially outwardly opening recess (18), a second member (14) adjacent said first member and defining a sealing surface (22) confronting said recess, said members being associated to have relative rotational movement about the axis of the recess and relative movement toward and from each other in the direction of said axis, an improved sealing structure (19) in said recess for movably sealing said members, comprising:
- an annular support member having a radially outer resilient connecting portion (27) and a radially inner rigid stiffener portion (23);
- an annular seal (20) formed of wear and abrasion resistant sealing material and having an axially inner portion carried by said stiffener portion, and an axially outer portion defining a sealing lip (21) sealingly engaging said confronting sealing surface (22);
- a rigid, radially outer annular base member (28) received coaxially in said recess, said support member connecting portion being received coaxially in said base member; and
- spring means (29) extending between said first member (11) at the axially outer end (16) of the recess (18) and said stiffener portion (23) of the support member to urge said lip into maintained movable sealed engagement with said cooperating surface notwithstanding relative axial movement between said members.

12. The joint sealing structure of claim 11 wherein said base member (28) defines a radially inturned flange (32) at said outer end of the recess (18), said spring means (29) further engaging said flange.

13. The joint sealing structure of claim 11 wherein said base member (28) is press fitted into said first member recess (18).

14. The joint sealing structure of claim 11 wherein said support member connecting portion (27) is compressed within said base member (28).

15. The joint sealing structure of claim 11 wherein said support member connecting portion (27) is bonded to said base member (28) and to said support member stiffener portion (23).

16. The joint sealing structure of claim 11 wherein said stiffener portion (23) is sealed to said seal (20) and connecting portion (27), said base portion (27) is sealingly bonded to said base member (28), and said base member (28) is sealingly fitted to said first member (11).

17. In a joint (10) having a first member (11) defining a cylindrical axially outwardly opening recess (18), a second member (14) adjacent said first member and defining a sealing surface (22) confronting said recess, said members being associated to have relative rotational movement about the axis of the recess and relative movement toward and from each other in the direction of said axis, an improved sealing structure (19,119) in said recess for movably sealing said members, comprising:
- an annular seal (120) formed of a rigid wear and abrasion-resistant sealing material and having an axially outer portion defining a lip (121) sealingly engaging said confronting sealing surface (22), an axially outer outwardly facing surface, and a radially outer surface;
- an annular support member (127) received coaxially in said recess formed of a material having effective resiliency over a wide range of temperatures and having a radially outer surface sealingly engaging said first member (11) and a radially inner surface sealingly engaged said radially outer surface of the seal (120); and
- spring means (129) extending between said first member (11) at the axially inner end (16) of the recess and said seal axially outer surface to urge said lip (121) into maintained movable sealed engagement with said cooperating surface notwithstanding relative axial movement between said members.

18. The joint sealing structure of claim 17 wherein said spring means (129) comprise Belleville spring means having a radially outer and axially inner portion engaging said seal (124) axially outer surface.

19. The joint sealing structure of claim 17 wherein said seal (124) defines an axially outer and radially inner annular recess, the axially outer surface of said recess defining said axially outer surface engaged by said spring means (129).

20. The joint sealing structure of claim 17 wherein said seal (124) defines an axially outer and radially inner annular recess having an outer diameter approximately equal to the inner diameter of said lip (121), the axially outer surface of said recess defining said axially outer surface engaged by said spring means (129).

21. The joint sealing structure of claim 17 wherein said support member (127) radially inner surface is bonded to said radially outer surface of the seal (120).

22. The joint sealing structure of claim 17 wherein said spring means (129) comprises a plurality of Belleville springs (130,131), said seal (137) defining an axially and radially inner annular recess, the axially outer surface of said recess defining said axially outer surface engaged by said spring means (129), said Belleville springs (130,131), said Belleville springs (130,131) having radially outer portions received in said recess.

23. The joint sealing structure of claim 17 wherein said spring means (129) comprises a pair of Belleville springs (130,131), said seal (137) defining an axially and radially inner annular recess, the axially outer surface of said recess defining said axially outer surface engaged by said spring means (129), said Belleville springs (130,131) contacting each other at the radially inner portions (134,135) thereof and diverging from each other radially outwardly.

* * * * *

UNITED STATES PATENT AND TRADEMARK OFFICE
CERTIFICATE OF CORRECTION

PATENT NO. : 4,256,316
DATED : March 17, 1981
INVENTOR(S) : HAROLD L. REINSMA

It is certified that error appears in the above-identified patent and that said Letters Patent are hereby corrected as shown below:

Claim 1, column 5, line 64, after "axially" cancel "inner" and substitute therefor --outer--; line 66, before "portion" cancel "outer" and substitute --inner--;

Claim 11, column 7, line 11, before "portion" cancel "inner" and substitute therefor --outer--; line 12, after "axially" cancel "outer" and substitute therefor --inner--.

Claim 17, column 8, line 3, before "portion" cancel "outer" and substitute therefor --inner--; line 15, after "axially" cancel "inner" and substitute therefor --outer--.

Claim 22, column 8, line 41, after "axially" cancel "outer" and substitute therefor --inner--; line 40, after "axially" insert --outer--.

Claim 23, column 8, line 48, after "axially" insert --outer--; line 49, after "axially" cancel "outer" and substitute therefor --inner--.

Signed and Sealed this

Sixth Day of October 1981

[SEAL]

Attest:

GERALD J. MOSSINGHOFF

Attesting Officer   Commissioner of Patents and Trademarks